United States Patent
Stappaerts et al.

[11] Patent Number: 6,115,123
[45] Date of Patent: Sep. 5, 2000

[54] HOLOGRAPHIC LASER AIMPOINT SELECTION AND MAINTENANCE

[75] Inventors: Eddy A. Stappaerts, San Ramon; William H. Long, Jr., Torrance, both of Calif.

[73] Assignee: Northrop Grumman Corporation, Los Angeles, Calif.

[21] Appl. No.: 09/290,339

[22] Filed: Apr. 12, 1999

[51] Int. Cl.[7] .................................................. G01B 9/02
[52] U.S. Cl. ........................ 356/345; 356/121; 356/363; 250/201.9
[58] Field of Search ................... 356/345, 121, 356/363; 250/201.9

[56] References Cited

U.S. PATENT DOCUMENTS

| | | | |
|---|---|---|---|
| 2,877,354 | 3/1959 | Fairbanks et al. | 250/203 |
| 4,063,815 | 12/1977 | Wilken et al. | 356/29 |
| 4,168,908 | 9/1979 | Cubalchini | 356/152 |
| 4,324,491 | 4/1982 | Hueber | 356/152 |
| 4,577,962 | 3/1986 | de Guillenschmidt et al | 356/5 |
| 4,671,654 | 6/1987 | Miyahara et al. | 356/152 |
| 4,825,055 | 4/1989 | Pollock | 235/411 |
| 5,007,736 | 4/1991 | Daniel et al. | 356/152 |
| 5,088,818 | 2/1992 | Nicholson | 356/152 |
| 5,196,688 | 3/1993 | Hesse et al. | 250/203.6 |
| 5,378,888 | 1/1995 | Stappaerts | 250/201.9 |
| 5,612,503 | 3/1997 | Sepp | 89/1.11 |

*Primary Examiner*—Robert H. Kim
*Assistant Examiner*—Andrew H. Lee
*Attorney, Agent, or Firm*—Terry J. Anderson; Karl J. Hoch, Jr.

[57] ABSTRACT

The present invention relates to a laser pointing and tracking system which forms and maintains a small laser spot size at a selected aimpoint on a target and compensates for optical distortion in the intervening media. The invention comprises an illumination laser for directing a first wide divergence beam of short-pulse laser radiation toward a stationary or moving target. The target reflects a portion of the incident beam as return radiation which is interfered with a properly-timed short-pulse reference beam on an electronic radiation detector array. The detector array signals are processed to produce an electronic hologram which is imposed as a phase pattern on a spatial light modulator. A laser reads out the hologram to direct a beam of radiation at the target. Multiple sequential illumination and hologram formation/readout steps produce a small spot size at the selected aimpoint. The small spot is maintained at the aimpoint during the duration of an engagement by repeating the above steps.

12 Claims, 6 Drawing Sheets

HOLOGRAPHIC LASER AIMPOINT SELECTION AND MAINTENANCE

FIELD OF THE INVENTION

Generally, the present invention relates to the field of weapons related laser target acquisition and tracking systems. More specifically, the present invention relates to a technique for aiming a laser beam at a selected point of a target and maintaining a small spot size in the presence of relative motion and/or atmospheric optical distortions.

BACKGROUND OF THE INVENTION

In weapons related target pointing and tracking (P&T) systems, laser beam energy must be transmitted through the earth's atmosphere or other aberrating media which may distort the beam radiation. Further, in such systems, the P&T system must compensate for relative motion of the tracking system and the target. With respect to distortion compensation, two techniques have been employed known as "conventional" and "unconventional". "Conventional" adaptive optics schemes use wavefront sensors combined with deformable mirrors. "Unconventional" adaptive optics schemes are primarily based on all-optical phase conjugation using nonlinear optics devices. Both techniques are reviewed in "Principles Of Adaptive Optics", by R. J. Ryson, Ch.3 (Academic Press 1991).

A third method for distortion compensation is referred to as "Holographic Interactive Tracker" (HIT). The operation of a HIT system comprises a first acquisition step and a second engagement step. In order to implement the HIT system, the target is typically detected and its approximate position known through the use of separate acquisition systems. The HIT system utilizes the information obtained from these other systems to complete the acquisition step.

In the acquisition step, a wide acquisition beam is directed to a known target. The frequency of this beam is locked to a master oscillator. A fraction of the diverging energy from the acquisition beam reflected by the target is returned as a beam or as diffuse radiation. The returned radiation is collected by a receiver and is interfered with a local oscillator beam on a charge-coupled-device detector array (CCD), thereby forming an electro-optic hologram. The hologram is processed, and the resulting pattern is transferred to a spatial light modulator (SLM) where the electronic hologram is written in as a phase-hologram.

In the engagement step of the HIT System, a beam from the same or a separate laser oscillator is reflected off the SLM. The SLM then outputs multiple beams of radiation. Most of the energy is contained within an image beam a conjugate image beam. Through the properties of phase-conjugation, the conjugate beam retraces the target return path while at the same time the wave-front distortions are undone, resulting in maximum energy delivery to the target. By repeating the acquisition and engagement steps as the target moves, the HIT system automatically tracks it.

The HIT system therefore provides automatic target acquisition and tracking as well as distortion compensation. The HIT System can also form the basis of a secure one-way or two-way communication system between stationary or moving platforms. The secure communication link can also be used for vehicle guidance, transmitting guidance commands along the narrow beam to the moving vehicle.

Reference may be had to the following patent for further information concerning the state of the technology relating to a HIT System: U.S. Pat. No. 5,378,888, issued Jan. 3, 1995 entitled "Holographic System For Interactive Target Acquisition And Tracking" issued to Stappaerts.

It is desirable in certain laser applications, such as directed energy weapons (DEW) and vibration sensing lidars, that a small spot be formed on a selected part of a target, and that it be maintained there during an engagement time, even in the presence of relative motion and/or optical distortions due to, for example, atmospheric turbulence. In DEW applications, a smaller spot size results in increased energy density on target and, therefore, increased effectiveness. In vibration sensing, a small spot size at the optimum target location is desired to maximize the vibration signal strength. It would therefore be desirable for a HIT System to be able to meet the requirements of such systems.

SUMMARY OF THE INVENTION

The present invention relates to an extension of the HIT system concept and is based on temporal gating of a hologram camera through the use of a very short local oscillator pulse to form a hologram of the selected part of a target. A single or multiple acquisition pulse(s) allow formation of a small spot size which, under certain conditions, is only limited by diffraction, even in the presence of severe optical distortions in the intervening medium. After the spot is formed, it can be moved within a limited angle (isoplanatic angle) to another location on the target, while maintaining its small size.

A wide divergence beam of radiation is directed at a target wherein the target reflects radiation as a return. A high speed detector receives a portion of the return radiation and then triggers the generation of a short-pulse reference beam. An electronic radiation detector array receives the pulsed reference beam and a portion of the return radiation pulse for interfering the return and the reference beam to generate an interference pattern in the form of electronic signals containing information about a slice of said target and said intervening media.

A hologram processor processes the electronic signals from the detector array to form a hologram pattern. A spatial light modulator responds to said electronic hologram pattern, records the processed hologram, and directs a beam of laser radiation incident onto said hologram for providing a conjugate beam directed at the selected part of the target.

The present invention may also include a first polarizing beam splitter for reflecting a beam generated by an illuminate laser to a spatial light modulator. The spatial light modulator may also include a pre-programmed pattern set to produce a beam divergence several times the angular extent of a target. A second polarizing beam splitter may also reflect a first part of the return radiation to said high speed detector and a second part of the return radiation to said electronic radiation detector array.

The present invention also describes a method for pointing a laser beam at a target and for forming a small spot at a desired target point with a compensation for optical distortion comprising the steps of: illuminating target space with laser radiation; receiving at a receiver at least one radiation return reflection from a target in said space; generating a short-pulse reference beam from the return reflection; interfering said return radiation with said reference beam to produce an interference pattern on a two-dimensional detector array to produce a hologram containing information about the selected part of a target and about the media and the return path between the target and the hologram to thereby store a two-dimensional array of electronic signals representing said hologram; transferring said array of signals from said two-dimensional detector array through a real-time electronic hologram processor; thereafter imposing the processed array of electronic signals on a spatial light modulator; and reading out the hologram on said spatial light modulator by interacting a second laser beam with said spatial light modulator hologram to direct a conjugate beam of focussed laser radiation automatically pointed to a selected part of said target as a beam which compensates for the effects encountered in passing through said media.

The present method may also include the step of shifting a local oscillator frequency from the master oscillator frequency by a doppler shift. The present method may also include the step of transferring the set array of signals from said two-dimensional detector array through a realtime electronic hologram processor in parallel communication to speed processing.

As with HIT systems, after the hologram is written on the CCD, it is read, processed, and then transferred to a high speed spatial light modulator (SLM). The total duration of these steps is the system latency time. This time is minimized by using parallel readout of all CCD rows (or columns), pipelined processing, and a fast SLM response time. The SLM is read out using the engagement laser, resulting in an image beam which is not used, and a conjugate image beam. The phase-conjugate beam has the unique property that, if relative motion during the latency time plus target roundtrip time is small, and the intervening medium distortions do not change significantly between the time they are sensed by the target return and the time the engagement beam passes through them, these distortions are compensated, enabling formation of a small spot at the aimpoint. If certain requirements on aperture size and the number of CCD/hologram pixels are satisfied, the minimum spot size is only limited by diffraction. A target can be tracked and the small spot maintained at the selected aimpoint during the engagement time by repeating the above procedure.

The first embodiment of the present invention discloses a laser target acquisition and tracking system with small-spot aimpoint selection and maintenance and compensation for optical distortion. The system comprises an illuminate laser frequency-locked to a laser master oscillator for directing a first wide-divergence beam of radiation through media toward a target wherein said target reflects a portion of said radiation as a beam or diffuse return; a high speed detector for receiving a portion of said return; a laser local oscillator frequency-locked to said master oscillator and triggered by said detector for generating a short-pulse reference beam where said pulsed reference beam has a variable delay with respect to the leading edge of said return; an electronic radiation detector array for receiving the interference of a portion of said return and said pulsed reference beam for providing detector array signals containing information about said media and a slice of said target selected by the delay and pulse length of said reference beam; a hologram processor responsive to said electronic signals from said radiation detector array to form an electronic hologram pattern; a spatial light modulator responsive to said electronic hologram pattern wherein said spatial light modulator records said hologram as a binary phase pattern; and a laser for directing a beam of radiation onto said spatial light modulator for providing a phase-conjugate beam being directed to a selected part of said target.

The laser target acquisition and tracking system of the present invention may also include a first polarizing beam splitter for reflecting a laser beam to said spatial light modulator; a second polarizing beam splitter for reflecting part of said target return to said high speed detector and said electronic radiation detector array; quarter wave plates to direct, in conjunction with said polarizing beam splitters, said illuminate beam to said target and said target return to said radiation detectors; a Pockels cell to reject the part of said target return outside said local oscillator pulse; a pre-programmed pattern set to produce a laser beam divergence several times the angular extent of a target wherein said hologram processor and said spatial light modulator are operated with M bits (M≧2).

The present invention also discloses a method for forming a small laser spot at an aimpoint on a target and with compensation for optical distortion by intervening media comprising the steps of: illuminating a target with a short pulse of laser radiation; detecting at a receiver a reflected radiation return from said target; generating a short-pulse reference beam triggered by and delayed with respect to said radiation return; interfering said target return with said pulsed reference beam on a two-dimensional detector array to thereby produce a hologram that is stored as an array of electronic signals; transferring said array of signals through a real-time electronic processor to produce a hologram pattern containing information about the part of the target selected by the pulsed reference beam and about the media between the target and the detector array; thereafter imposing said processed array of electronic voltages on a spatial light modulator; and reading out the hologram on said spatial light modulator by interacting a second laser beam with said hologram on said spatial light modulator to direct a conjugate beam of focused laser radiation compensated for the effects of media distortion to the selected part of said target.

The method of the present invention may include multiple sequential hologram formation and readout steps using illuminate beams offset in elevation and/or azimuth angle with respect to the first illuminate beam to provide a small spot size at the desired aimpoint on the target.

The method of the present invention may further include the steps of: shifting the local oscillator frequency from the master oscillator frequency by the Doppler frequency shift between the target and the detector array; transferring a set of signals from said two-dimensional detector array through a real-time hologram processor onto said spatial light modulator on all lines in parallel.

It should be noted and understood that with respect to the present invention, the material suggested may be modified or substituted to achieve the general overall resultant high efficiency. The substitute of materials or dimensions remain within the spirit and scope of the present invention.

DETAILED DESCRIPTION OF THE PREFERRED EMBODIMENTS

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

In contrast to the previously discussed HIT System, the present invention uses one or more short, precisely-timed local oscillator pulse(s) to form a hologram of the selected part of a target. The concept applies to extended targets which do not exhibit enhanced reflectivity at the aimpoint. A simple algorithm is used for formation and maintenance of a small spot at the aimpoint.

Figure 1:
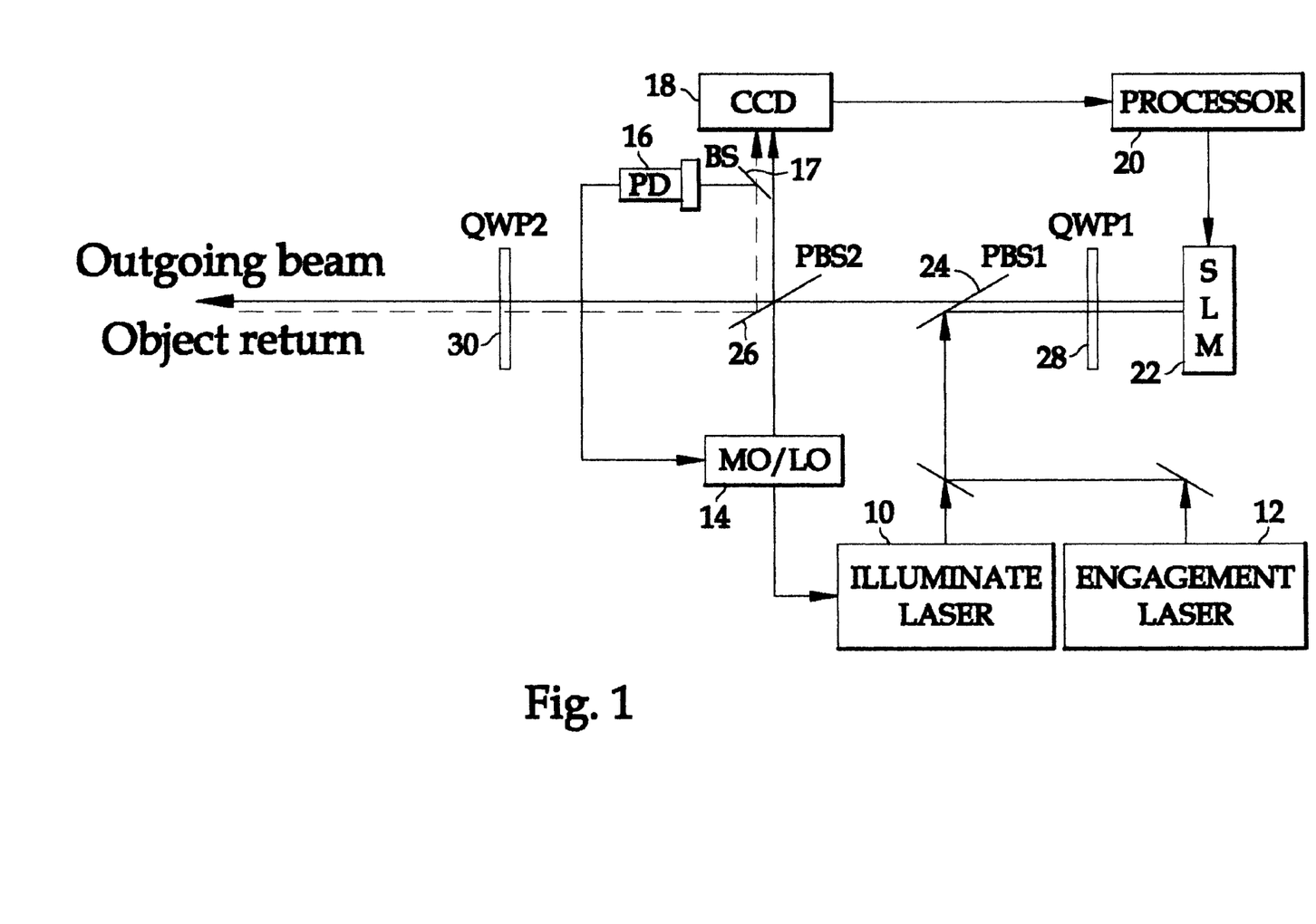
FIG. 1 is a schematic illustration of the apparatus and system of the present invention.

FIG. 1 shows a schematic of the first embodiment of the present invention. The system components include an illuminate laser 10, an engagement laser 12 (can be the same as the illuminate laser in some applications), a master oscillator/local oscillator (MO/LO) 14, a high speed detector (PD) 16, an integrating detector array such as a charge-coupled device (CCD) 18, a hologram processor 20, and a spatial light modulator (SLM) 22. Polarizing beam splitters (PBS1 24 and PBS2 26) and quarter waveplates (QWP1 28 and QWP2 30) are used to direct the beams to the various components and to a target. In a typical application, the approximate direction and range of the target are known a priori, from other optical and/or radar sensors.

The system operation is as follows. At time zero, the illuminate laser 10 transmits a short pulse typically 10–100 ps, to a target. As with the HIT system, the frequency of this laser is controlled by the master oscillator portion of the MO/LO 14. The laser radiation is polarized such that the beam is reflected off PBS1 24 towards the SLM 22. The SLM 22 pattern is set to produce a beam divergence which is typically several times the angular extent of the target. After double-passing the quarter-waveplate QWP1 28, the laser polarization is rotated 90 degrees such that the beam is transmitted by PBS1 24 and PBS2 26. A second quarter-waveplate, QWP2 30, converts the linear polarization into an outgoing circular polarization.

A target roundtrip time later, a return pulse arrives which, after passing through QWP2 30, is reflected off PBS2 26. Part of the return pulse is sent to the high speed detector PD 16, using a BS 17, while the other part is sent to the CCD 18. The beam splitter (BS) 17 directs part of the beam incident on it to PD 16, while the rest is transmitted to CCD (18). The high speed detector PD 16 triggers the generation of a short, typically 10–100 ps, LO pulse which is directed to the CCD 18 to provide a reference beam for hologram formation. The reference beam passes through a polarizing beam splitter, PBS2$_{26}$ which is partially transparent for the LO polarization. The timing and length of the LO pulse are set to select a desired target slice. For targets moving at very high speeds, the LO frequency is shifted from the MO frequency by the Doppler shift. The interference of the reference beam and target return radiation writes a hologram on the CCD 18. The CCD 18 is read out, all rows (or columns) in parallel for maximum speed. The hologram is processed, all rows (or columns) in parallel, in a pipelined manner. The primary function of the hologram processor 20 is to remove the large reference beam offset and extract the useful hologram information, $H(x,y)=o(x,y)*R+o(x,y)R*$, where $o(x,y)$ and R are the electric fields of the object return and reference beams, respectively.

Figure 3:
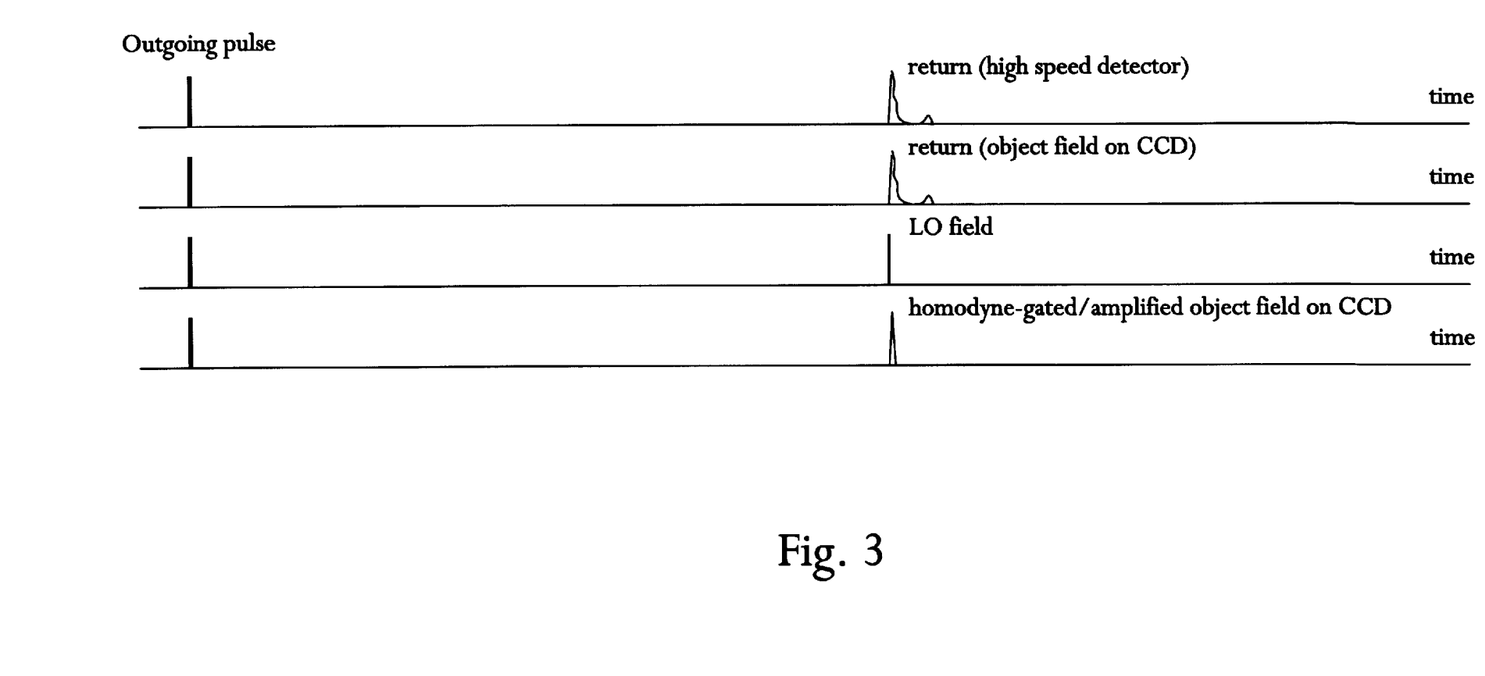
FIG. 3 is an illustration of the gated hologram write process.

Next, the hologram pattern $H(x,y)$ is transferred to the SLM 22, all lines (or columns) in parallel. For the simplest case of a single illuminate pulse, the SLM 22 is then read out using a beam from the engagement laser 12. The pulse length of this laser can be much longer than that of the illuminate laser 10 and is primarily limited by the requirement that the target not move appreciably and the intervening medium distortion not change significantly. For the simplest case of a binary hologram, the SLM 22 output has approximately 40% of its energy in an image beam and 40% in a conjugate image beam. With proper system alignment, due the properties of the phase conjugation process, the conjugate image beam returns to the part of the target that produced the hologram, and optical aberrations are compensated. The image beam is typically transmitted in a different direction and is further aberrated and therefore not useful. A slice of the target is selected by setting the delay between the leading edges of the target return and LO pulses, and the LO pulse length. Target return and LO pulse waveforms are illustrated in FIG. 3.

Figure 2:
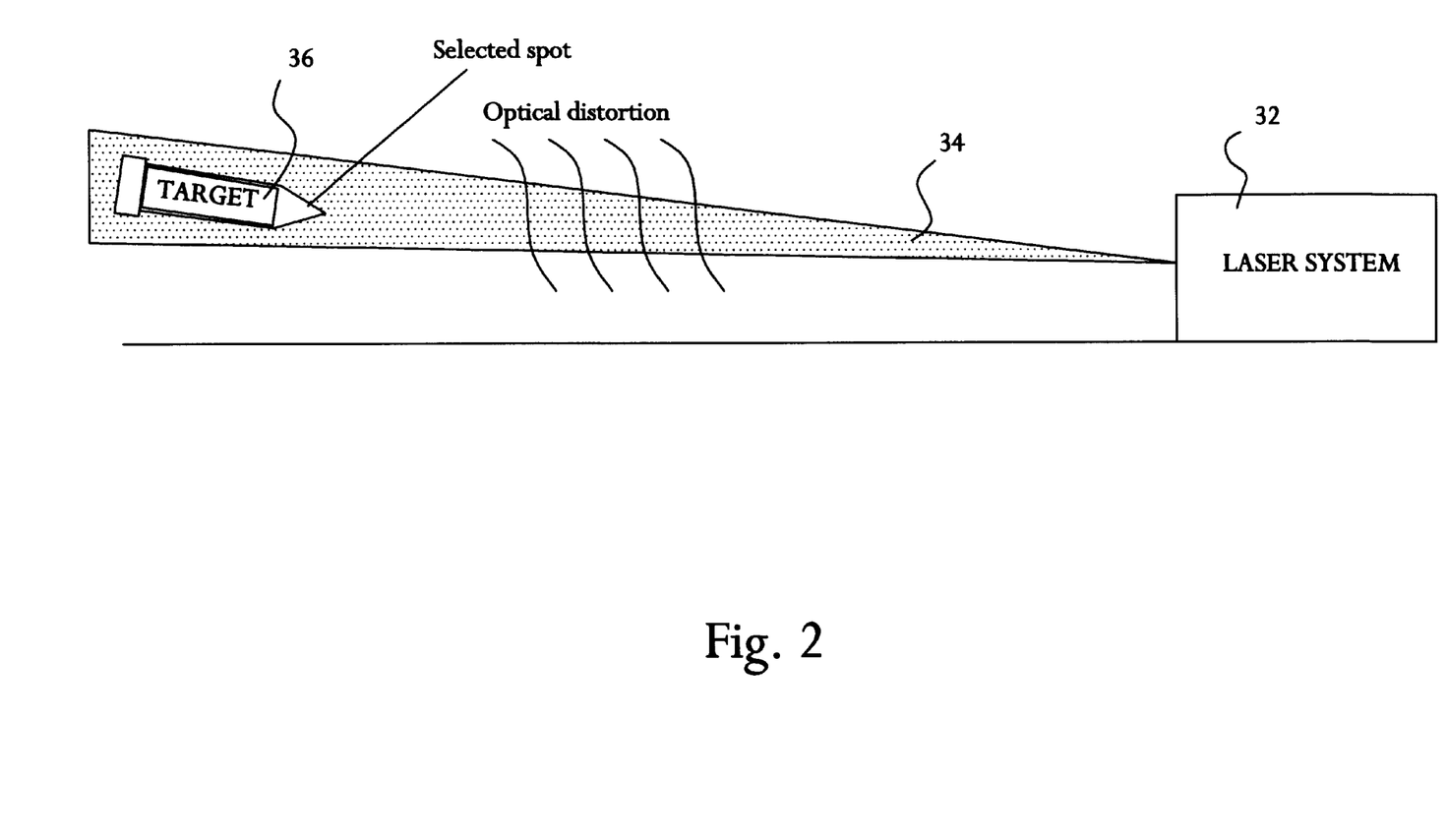
FIG. 2 is a graphic illustration of an example of engagement geometry.

The basic operation, for the example of a conically-shaped target is shown in FIG. 2. A laser system projects an acquisition beam 34 which must travel through optical distortion caused by atmospheric conditions or other like conditions. The acquisition beam 34 is wide enough to cover the entire target 36. The objective is to form a small spot on the nose of the target. The process of writing the hologram of the selected part of the target is illustrated in FIG. 3. First, the illumination laser 10 transmits a short pulse typically 10–100 ps. The leading edge of the target return pulse is detected using a high speed detector (PD) 16 which triggers the generation of a short, typically 10–100 ps, local oscillator (LO) pulse which illuminates a CCD 18. To select the nearest part of the target, the optical pathlengths for the CCD 18 and target return paths are equal such that the leading edges of the LO and target return pulses arrive at the CCD 18 at the same time. The interference of these two pulses writes a hologram of a slice of the target. As an example, for rectangular illuminate and LO pulses, and for a 60 ps LO pulse length, the length of the target slice is about 1 cm. Effectively, the LO pulse acts as a gate which selects part of the target. Target slices further away from the laser can be selected by electronically delaying the LO pulse with respect to the leading edge of the target return pulse.

Figure 4:
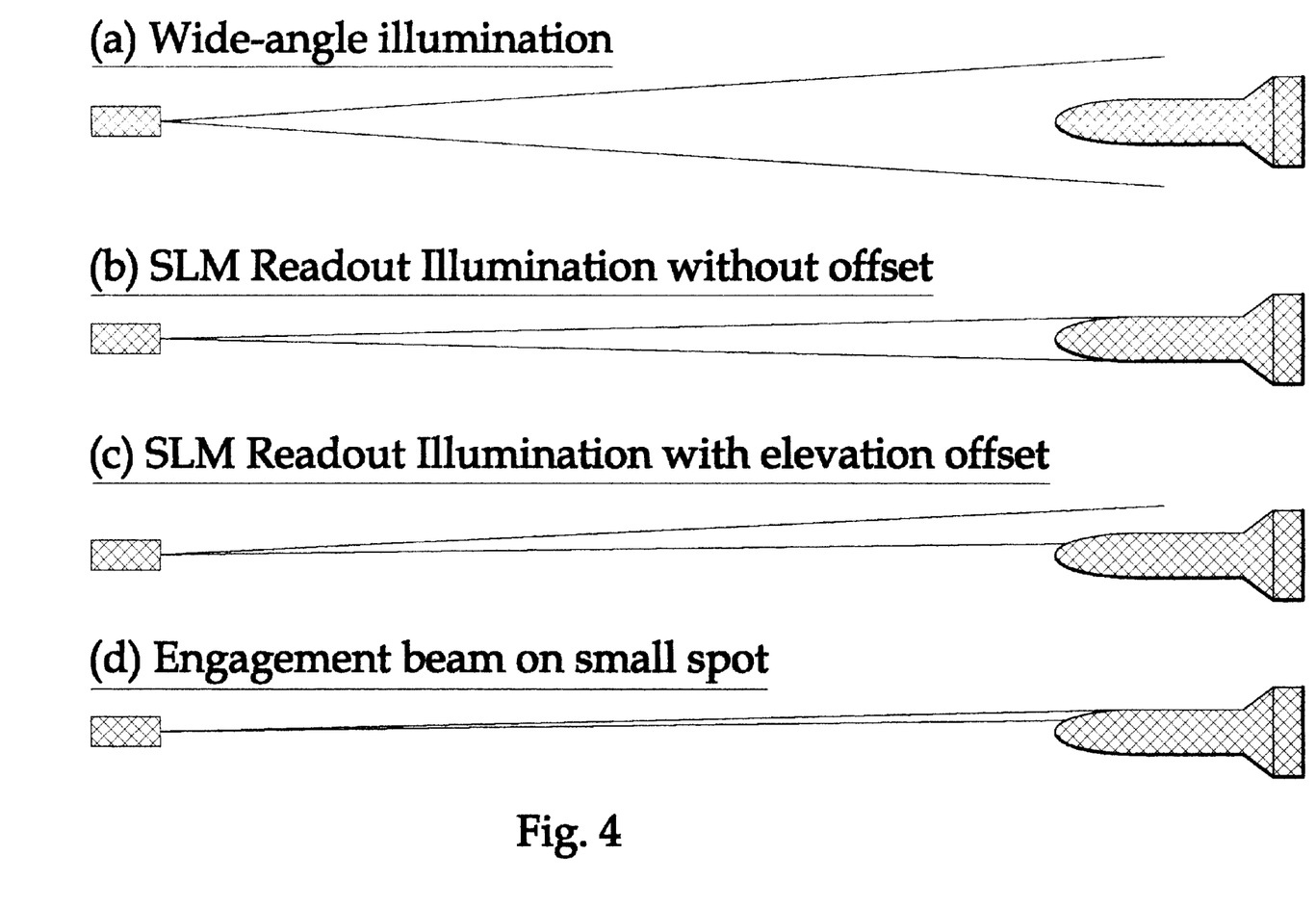
FIG. 4 is a graphical illustration of multiple-step small spot formation.

The invention provides additional capabilities through the use of multiple illuminate/LO pulses to form a final hologram which is read out by the engagement laser. As an example, in FIG. 4, three illumination pulses are used to form a hologram which, on readout, results in a small spot which is displaced from the target center. The timing and length of the first LO pulse select a spot as shown in FIG. 4b. This hologram is read out with an illumination beam which is off-set in elevation from the first illumination beam, as illustrated in FIG. 4c. The LO timing and pulse width for the second illumination pulse are set to select a slice of the target. The resulting hologram corresponds to an arc which is narrow in the vertical (elevation) direction. To form a spot which is small in both directions, the second hologram is read out using a third illumination beam which is offset in azimuth from the first beam. At the target range, this beam forms an arc-shaped illumination similar to the arc sensed in the second step. The LO timing and pulse width select part of the illuminated arc and thereby a small two-dimensional spot as illustrated in FIG. 4d. In the final engagement step, the third hologram is read out, resulting in deposition of the laser energy on the small spot. As an example, for a target range of 10 km and an SLM response time of 40 $\mu$sec, the total duration of the three-pulse beam formation process is approximately 300 μsec, which is much less than typical atmospheric decorrelation times such that effective aberration compensation is possible.

Figure 5:
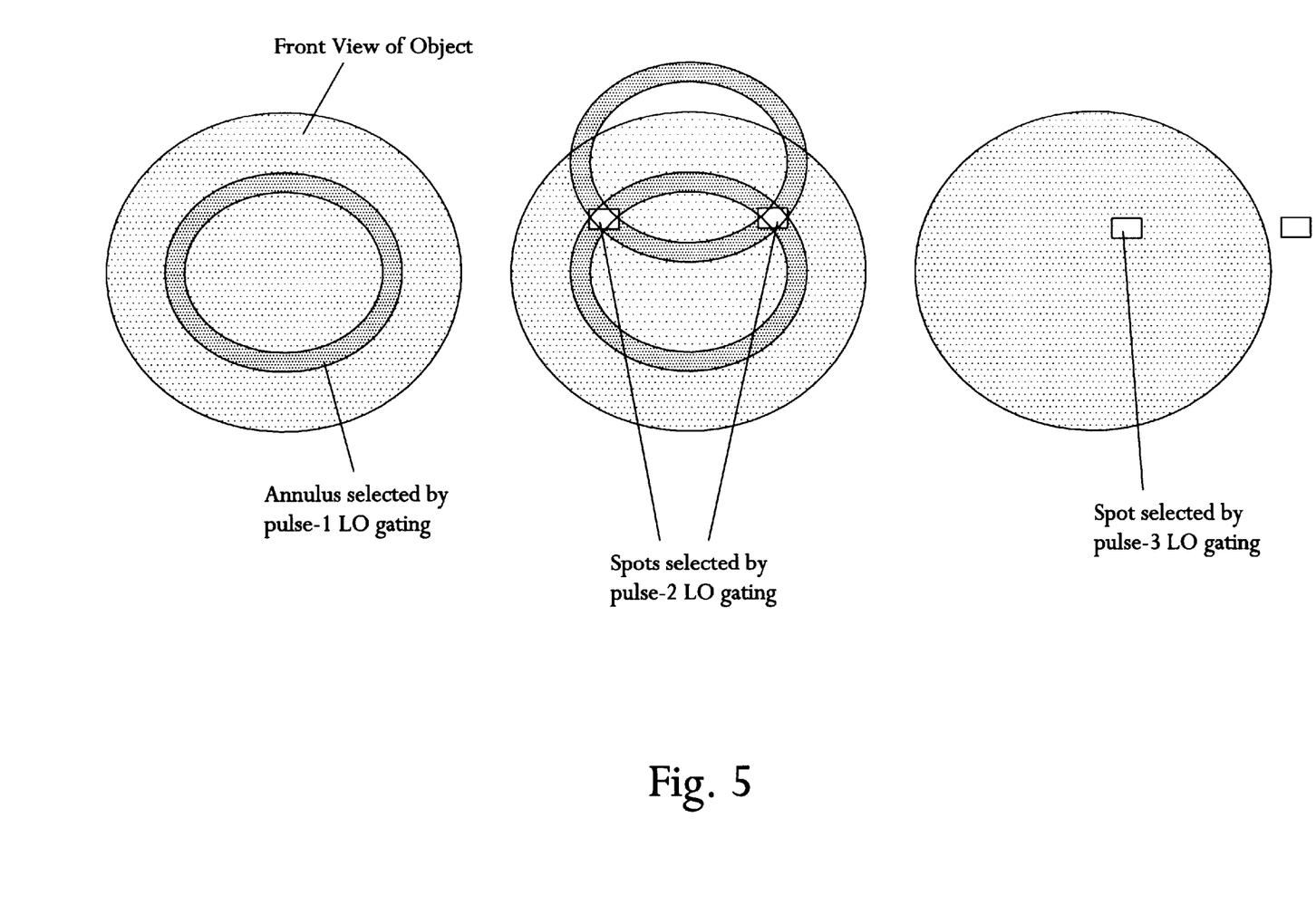
FIG. 5 is an illustration of alternate embodiment of a multiple-step small spot formation algorithm.

Alternate algorithms can be used to form a small spot at a selected aimpoint. FIG. 5 shows an example where the first LO pulse selects an annulus on the target by properly delaying the LO pulse. Using two additional illumination pulses with small elevation and azimuth offsets, respectively, a small spot is formed at the selected aimpoint.

The angular offset of the second and third illumination beams can be realized by changing the angle of incidence of the SLM readout beam from the illuminate laser. Alternately, the LO beams for the second and third hologram can be tilted compared to the first hologram. The resulting holograms have a built-in angular offset and can be read without changing the angle of incidence of the SLM readout beam. Beamsteering of the LO can be accomplished using, for example, a low power high speed SLM.

Figure 6:
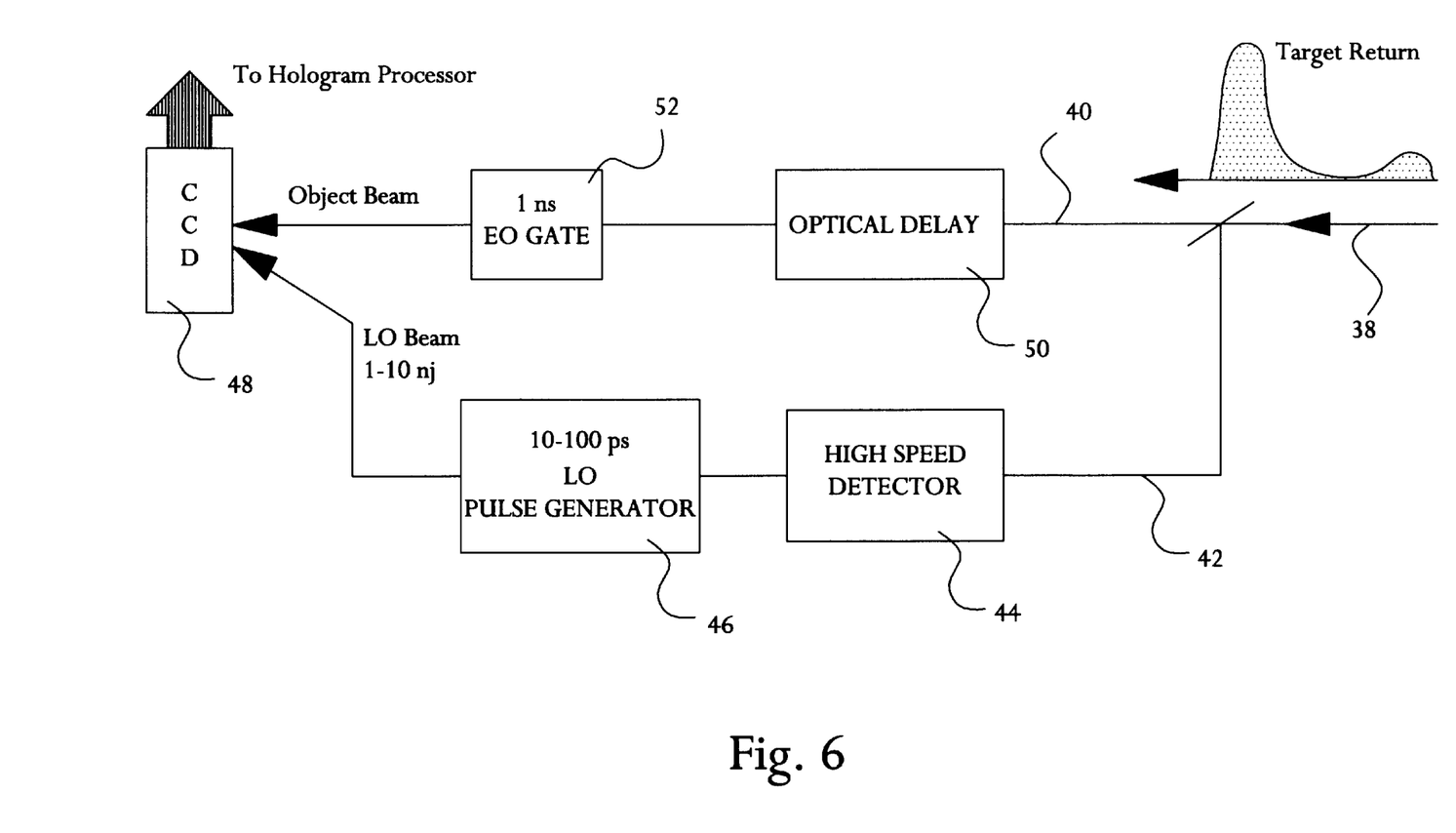
FIG. 6 is a block diagram illustration for gated hologram formation.

A block diagram for writing a gated hologram is shown in FIG. 6. The target return pulse is split into two parts 40 and 42. One part is sent to a high speed detector 44 which detects the leading edge of the return. The output of this detector triggers a pulse generator 46 to generate a short LO pulse which illuminates a CCD 48. The second part of the target return beam 40 is sent to the CCD 48. An optical delay 50 can be inserted, as necessary, to adjust the relative timing of the target return and LO pulses. An alternate timing technique uses high precision electronic delay generators to obtain the desired temporal relationship between target return and LO pulses. The upper beam path 40 also may have a short, typically 1 ns, gate 52 such as an EO switch to reject returns from parts of the target outside the temporal window set by the LO. Even though radiation outside the LO pulse is not amplified by homodyning, it contributes noise which must be minimized.

To be effective, relative motion and/or changes in optical distortions during the multiple-step beam formation process must be small. With some targets, it is possible to perform single or multiple pulse acquisition on one part of the target and then select an engagement aimpoint which is displaced from the target feature used for the initial acquisition and small spot formation. Whenever angular offsets are used, they must be within the isoplanatic angle such that the phase conjugation process has high fidelity.

The high speed detector 44 typically uses direct detection. This detection mode is less sensitive than coherent detection. In some applications, the conventional HIT system, which does use coherent detection but does not provide temporal resolution, can be used to form a first hologram which, on readout, directs the energy of a subsequent illumination beam onto the target, as illustrated in FIGS. 4a–4b.

In most applications, the approximate target direction is provided by another sensor such as an infrared camera. A "fence" can then be set up in the approximate target direction by transmitting a train of illumination pulses and gating the LO at a fixed delay with respect to these ongoing pulses. The location of the fence is at a range equal to the speed of light times half the delay time. As an example, a delay time of 20 μsec will establish a fence at a range of 3 km. When a target traverses the fence, a hologram is formed. This hologram can be used to point the beam used to initiate the beam formation processes described above. The illuminate laser repetition rate must be sufficiently high such that the target cannot pass through the fence in between pulses.

The fraction of the laser energy reflected off the SLM in the desired conjugate image can be increased by using more than two phase levels. If the number of phase levels is increased from two to four, the fractional energy in the conjugate image beam increases from 40% to about 80%. For this mode of operation, two holograms must be formed with local oscillator beams which are ninety degrees out of phase with respect to each other (quadrature detection). If the number of phase levels is four or eight, the hologram processing can be done at high speed in a pipelined manner, without the need for evaluating trigonometric functions, similar to binary operation. A high speed minimizes system latency time which is critical to high fidelity optical aberration compensation.

Additional modifications and improvements of the present invention may also be apparent to those skilled in the art. Thus, the particular combination of the parts described and illustrated herein is intended to represent only one embodiment of the present invention, and is not intended to serve as limitations of alternative devices within the spirit and scope of the invention.

What is claimed is:

1. A laser target acquisition and tracking system with small-spot aimpoint selection and maintenance and compensation for optical distortion comprising:

a) an illuminate laser frequency-locked to a laser master oscillator for directing a first wide-divergence beam of radiation through media toward a target wherein said target reflects a portion of said radiation as a beam or diffuse return;

b) a high speed detector for receiving a portion of said return;

c) a laser local oscillator frequency-locked to said master oscillator and triggered by said detector for generating a short-pulse reference beam where said pulsed reference beam has a variable delay with respect to the leading edge of said return;

d) an electronic radiation detector array for receiving the interference of a portion of said return and said pulsed reference beam for providing detector array signals containing information about said media and a slice of said target selected by the delay and pulse length of said reference beam;

e) a hologram processor responsive to said electronic signals from said radiation detector array to form an electronic hologram pattern;

f) a spatial light modulator responsive to said electronic hologram pattern wherein said spatial light modulator records said hologram as a binary phase pattern; and g) a laser for directing a beam of radiation onto said spatial light modulator for providing a phase-conjugate beam being directed to a selected part of said target.

2. The laser target acquisition and tracking system of claim 1 further comprising a first polarizing beam splitter for reflecting a laser beam to said spatial light modulator.

3. The laser target acquisition and tracking system of claim 2 further comprising a second polarizing beam splitter for reflecting part of said target return to said high speed detector and said electronic radiation detector array.

4. The laser target acquisition and tracking system of claim 3 further comprising quarter wave plates to direct, in conjunction with said polarizing beam splitters, said illuminate beam to said target and said target return to said radiation detectors.

5. The laser target acquisition and tracking system of claim 4 further comprising a Pockels cell to reject the part of said target return outside said local oscillator pulse.

6. The laser target acquisition and tracking system of claim 5 wherein said spatial light modulator includes a pre-programmed pattern set to produce a laser beam divergence several times the angular extent of a target.

7. The laser target acquisition and tracking system of claim 6 wherein said hologram processor and said spatial light modulator are operated with M bits (M≧2).

8. A method for forming a small laser spot at an aimpoint on a target and with compensation for optical distortion by intervening media comprising the steps of:
   a) illuminating a target with a short pulse of laser radiation;
   b) detecting at a receiver a reflected radiation return from said target;
   c) generating a short-pulse reference beam triggered by and delayed with respect to said radiation return;
   d) interfering said target return with said pulsed reference beam on a two-dimensional detector array to thereby produce a hologram that is stored as an array of electronic signals;
   e) transferring said array of signals through a real-time electronic processor to produce a hologram pattern containing information about the part of the target selected by the pulsed reference beam and about the media between the target and the detector array;
   f) thereafter imposing said processed array of electronic voltages on a spatial light modulator; and
   g) reading out the hologram on said spatial light modulator by interacting a second laser beam with said hologram on said spatial light modulator to direct a conjugate beam of focused laser radiation compensated for the effects of media distortion to the selected part of said target.

9. The method of target acquisition of claim 8 wherein multiple sequential hologram formation and readout steps using illuminate beams offset in elevation and/or azimuth angle with respect to the first illuminate beam are used to provide a small spot size at the desired aimpoint on the target.

10. The method for maintaining a small spot size on a selected aimpoint on a moving target during an engagement period by repeating the steps of claim 9.

11. The method of target acquisition of claim 8 further comprising the step of shifting the local oscillator frequency from the master oscillator frequency by the Doppler frequency shift between the target and the detector array.

12. The method of target acquisition of claim 8 wherein the step of transferring a set of signals from said two-dimensional detector array through a real-time hologram processor onto said spatial light modulator is completed on all lines in parallel.

* * * * *